2,795,589
N-SUBSTITUTED IMIDES OF HEXACHLORO BICYCLO [2.2.1]HEPTENE DICARBOXYLIC ACIDS

Henry Bluestone, Shaker Heights, Ohio, assignor to Velsicol Chemical Corporation, a corporation of Illinois No Drawing. Application March 4, 1953,
Serial No. 340,392

6 Claims. (Cl. 260—326)

This invention relates to new compositions of matter. More specifically, the present invention relates to N-substituted imides of 1,4,5,6,7,7-hexachlorobicyclo-[2.2.1]-5-heptene-2,3-dicarboxylic acid. These products may be prepared by heating the anhydride of the above chlorinated dicarboxylic acid with a primary amine. The anhydride, termed 1,4,5,6,7,7-hexachlorobicyclo-[2.2.1]-5-heptene-2,3-dicarboxylic anhydride is prepared according to the procedure shown in United States Patent No. 2,606,910, granted August 12, 1952, to Herzfeld et al.

An alternative method for preparing the present products is by reacting the N-alkali metal derivative of 1,4,5,6,7,7-hexachloro-bicyclo-[2.2.1]-5-heptene - 2,3 - dicarboximide with an organic halide such as an alkenyl halide and producing the N-substituted imide as a result of the metathetical reaction which ensues.

The present products are valuable for plasticizing and softening heavy, tough polymeric and elastomeric materials such as rubber, polyvinyl chloride, polyvinyl chloride-acetate, neoprene, polyvinylbutyral, polyvinylidene chloride, polystyrene, styrene copolymers, polyacrylonitrile, butadiene-styrene copolymers, thiokols, polyester resins, varnish resins, cellulose acetate, cellulose acetate-butyrate, and similar natural and synthetic materials.

The products of the present invention may be incorporated into such elastomers and resins at normal room or elevated temperatures by the use of standard rubber working machinery such as two roller rubber mills, Banbury mixers, plasticators, and the like. Alternatively, the plasticizers may be mixed by stirring with finely divided resins such as vinyl resins suitable for slush molding.

An important feature of the present invention is the fact that the present products not only plasticize polymers and elastomers, but concomitantly provide or improve their fire retardancy characteristics and provide protection against attack from fungi, such as mildew.

The fire resistant and fungistatic properties thus imparted are not only restricted to polymers and elastomers, but are also apparent when the products of this invention are incorporated into other materials. For example, N-substituted 1,4,5,6,7,7-hexachlorobicyclo-[2.2.1] - 5 - heptene-2,3-dicarboximide may be used effectively to protect cotton goods, wood, wood pulp products, leather goods, paper goods, canvas, rope, marine supplies, paints, insulating materials, caulking and sealing compounds and other materials which are exposed to the hazards of fire and fungus attack.

These N-substituted imides may also be utilized as stabilizing materials for protection of certain materials against the action of such metal impurities as copper or manganese which metals are known to catalyze oxidative degradation of unsaturated oils and polymers. Thus the material may be used as an inhibitor of the action of these metals. They are also valuable as plant growth inhibitors.

The amines utilized in the present process are primary monofunctional amines containing from 1 to 22 carbon atoms inclusive of the group aliphatic amines, cycloaliphatic amines, and aromatic amines. Examples of amines which may be used are as follows:

Methyl amine
Ethylamine
Propylamine
Isopropylamine
Allylamine
Isobutylamine
n-Butylamine
Isoamylamine
n-Amylamine
n-Hexylamine
n-Hexenylamine
1-amino-2-butene
n-Heptylamine
Cyclohexylamine
l-Menthylamine
Cyclopentylamine
2-amino-bicyclo-[2.2.1]-5-heptene
Aniline
Benzylamine
α-Phenylethylamine
2-phenoxyethylamine
2-phenylethylamine
o-Toluidine
m-Toluidine
4-amino-1,3-dimethyl-benzene
2-amino-1,4-dimethyl-benzene
m-Ethylaniline
o-Ethylaniline
2-methoxyethylamine
2-ethoxybutylamine
3-methoxypropylamine
2-methoxypropylamine
4-methoxypentylamine
o-Anisidine
Halogenated ethylamine
Halogenated propylamine
Halogenated butylamine
n-Octylamine
Iso-octylamine
Nonylamine
Decylamine
Decenylamine
Undecylamine
Pentadecylamine
Undecenylamine
2-ethyl-hexylamine
Hexadecylamine
Nonadecylamine
Eicosylamine
2-methylcycloheptylamine
2-aminocycloheptylamine
Amino-iso-camphene
ω-Aminopinane
2-bromoaniline
Mesidine
2-amino-3-isopropyl-toluene
Phenylhydrazine
Duradine
1-anthramine
2-anthramine
Aminobiphenyl
1-naphthylamine
3,5-dimethyl-1-naphthyl-amine
4-(p-tolyl)-2-naphthyl-amine
α-Methyl-α-phenylhydrazine
o-Phenetidine
m-Phenetidine
p-Anisidine
2-methoxycyclohexylamine
4-ethoxy-3-cyclopentenyl-amine
5-amino-6-ethoxy-bicyclo-[2.2.1)-2-heptene
o-Chloroaniline
3,5-dibromo-4-amino-toluene
3-trifluoromethyl-aniline The amines above listed are only intended to exemplify primary mono-amines which can be used to form the present products and do not represent a comprehensive list.

The products of the present invention are N-substituted imides of 1,4,5,6,7,7-hexachlorobicyclo-[2.2.1]-5-heptene-2,3-dicarboxylic acid wherein the substituent on the imide nitrogen is the amino-free residual radical of a primary monofunctional amine containing 1 to 22 carbon atoms of the group consisting of aliphatic amines, cycloaliphatic amines and aromatic amines. By primary monofunctional amines as previously exemplified are meant aliphatic, cycloaliphatic and aromatic compounds containing one amino group and no other reactive group.

The products of the present invention may be prepared by adding equimolar quantities of the anhydride material and the primary amine desired together in a mutual inert solvent. The reaction proceeds exothermically at room temperature with some of the alkyl and aryl amines, but in some instances elevated temperatures are necessary to produce the imide. Generally, the reaction may be carried out at temperatures from about 10° C. to about 200° C.; a preferred range of temperatures is from about 25° C. to about 125° C. When elevated temperature is desired, these conditions can best be maintained by utilizing refluxing conditions with a solvent boiling in appropriate temperature range.

Many solvents which have an appropriate boiling point and which are relatively inert to the reactants and conditions employed are available. Exemplary of a few of these solvents are carbon tetrachloride, benzene, toluene, heptane, xylene, ethyl ether, and the like.

The time of reaction is not critical, and the rate of reaction will generally depend on the temperature employed. Sufficient time should be allowed for complete utilization of the reactants; however, a shorter period will merely result in a lesser yield of desired product.

The reaction of an acid anhydride and an amine to form an imide derivative results in the production of water as a by-product. If desired, this water may be removed from the reaction mixture by use of a Dean-Stark tube attached to the reflux condenser.

The following examples illustrate the preparation of many compounds within the scope of this invention:

EXAMPLE I

*Preparation of N-phenyl-1,4,5,6,7,7-hexachlorobicyclo-[2.2.1]-5-heptene-2,3-dicarboximide*

One mole of C. P. aniline (93 g.) was added to a beaker containing one mole (371 g.) of 1,4,5,6,7,7-hexachlorobicyclo - [2.2.1] - 5 - heptene - 2,3 - dicarboxylic anhydride in 300 cc. of toluene. A voluminous precipitate formed. The precipitate adsorbed an appreciable amount of toluene which was partially removed by suction filtration. A sample of the product was recrystallized twice from ethanol and after drying under vacuum, melted at 229–230° C. and had an elementary analysis as follows:

Calculated for $C_{15}H_7Cl_6O_2N$: C, 40.36%; H, 1.57%; Cl, 47.76%. Found for product: C, 40.08%; H, 1.48%; Cl, 47.78%.

The product is thus the desired N-phenylimide as above named.

EXAMPLE II

*Preparation of N-butyl-1,4,5,6,7,7-hexachlorobicyclo-[2.2.1]-5-heptene-2,3-dicarboximide*

One quarter mole (18.2 g.) of redistilled n-butylamine was added to 1,4,5,6,7,7 - hexachlorobicyclo - [2.2.1]-5-heptene-2,3-dicarboxylic anhydride (0.25 mol; 93 g.) in 300 cc. toluene. The temperature of the mixture rose slowly due to heat of reaction. After the materials had reacted for one hour the toluene and water formed during the reaction were removed by distillation in vacuo. The residue was a syrupy material which upon standing overnight in the cold, partially solidified into crystals. This solid was recrystallized twice from cold 95% ethanol and once from methanol. The material melted at 105° C. and had the following elementary analysis:

Calculated for $C_{13}H_{11}Cl_6O_2N$: C, 36.62%; H, 2.58%; Cl, 50.00%. Found for product: C, 36.93%; H, 2.75%; Cl, 49.93%.

The product is thus the N-butyl imide as above named.

EXAMPLE III

*Preparation of the N-(2-ethyl-hexyl)-1,4,5,6,7,7-hexachlorobicyclo-[2.2.1]-5-heptene-2,3-dicarboximide*

To 1,4,5,6,7,7-hexachlorobicyclo - [2.2.1] - 5 - heptene-2,3-dicarboxylic anhydride (0.25 mol; 93 g.) in 300 ml. of toluene was added 2-ethylhexylamine (0.25 mol; 32.2 g.). The materials were added together at room temperature and the exothermic heat of reaction caused the temperature of the reactants to rise about 25° C. After one hour the toluene and water present were removed by distillation in vacuo. The residual material was a liquid which became solid upon standing at about 10° C. overnight. This solid was taken up in warm (50° C.) 95% ethanol and the resultant solution was treated with activated charcoal and filtered with the aid of "Supercel" filter-aid. The filtrate was cooled to room temperature and a precipitate formed which was recovered by suction filtration. Upon drying the product melted at 90–91° C.

Calculated for $C_{17}H_{19}Cl_6O_2N$: C, 42.32%; H, 3.94%; Cl, 44.19%. Found for product: C, 42.53%; H, 3.93%; Cl, 44.26%.

The product is thus the N-(2-ethyl-hexyl)-imide as above named.

EXAMPLE IV

*Preparation of N-nonyl-1,4,5,6,7,7-hexachlorobicyclo-[2.2.1]-5-heptene-2,3-dicarboximide*

To 1,4,5,6,7,7-hexachlorobicyclo-[2.2.1] - 5 - heptene-2,3-dicarboxylic anhydride (0.25 mol; 93 g.) in toluene (300 ml.) was added nonylamine (0.25 mol; 35.7 g.; nonylamine had a boiling point of 173–176° C. and was obtained from Rohm and Haas) over a four-minute period. During addition the temperature rose from room temperature to about 50° C. After one hour, the toluene solvent and water formed during reaction was removed by vacuum distillation. The residue, a viscous liquid, was dissolved in 100 ml. of hot 95% ethanol, treated with activated charcoal, filtered and cooled to normal room temperature. A precipitate formed which was isolated by filtration. The thus isolated solid was twice recrystallized from 95% ethanol and once from methanol. It melted at 88–90° C. and had the following elementary analysis:

Calculated for $C_{18}H_{21}Cl_6O_2N$: C, 43.55%; H, 4.23%; Cl, 42.94%. Found for product: C, 43.97%; H, 4.20%; Cl, 43.02%.

The product is thus the N-nonyl imide as above named.

EXAMPLE V

*Preparation of N - (n - heptyl) - 1,4,5,6,7,7 - hexachlorobicyclo-[2.2.1]-5-heptene-2,3-dicarboximide*

To 1,4,5,6,7,7 - hexachloro - bicyclo - [2.2.1] - 5 - heptene-2,3-dicarboxylic anhydride (0.25 mol; 93 g.) in 300 cc. of toluene, was added n-heptylamine (0.25 mol; 99 g.) over a four-minute period. The temperature rose about 25° due to the exothermic nature of the reaction. The mixture was cooled slowly to room temperature and the toluene solvent and water were removed by vacuum distillation. The residue was dissolved in 100 ml. of hot 95% ethanol, treated with activated charcoal, and filtered with the aid of "Supercel." The filtrate was cooled to room temperature and a precipitate formed which was isolated by filtration. It was recrystallized twice from ethanol and melted at 73.5–74° C. Analysis of the product gave:

Calculated for $C_{16}H_{17}Cl_6O_2N$: C, 41.03%; H, 3.63%; Cl, 45.51%. Found for purified product: C, 41.22%; H, 3.68%; Cl, 45.40%.

The product is thus the N-(n-heptyl) imide as above named.

EXAMPLE VI

*N - hexadecyl - 1,4,5,6,7,7 - hexachlorobicyclo -[2.2.1]-5-heptene-2,3-dicarboximide*

(The amine utilized was a commercial product known as "Armeen 16D" which is a mixture of 16 carbon atom aliphatic primary amines obtainable from Armour and Company.)

To a slurry of 186 g. (0.5 mole) 1,4,5,6,7,7-hexachlorobicyclo - [2.2.1] - 5 - heptene - 2,3 - dicarboxylic anhydride in 300 ml. of toluene, was added over a twenty-minute period, 132 g. (0.55 mole) Armeen 16D. The temperature of the reaction mixture rose from 25° to 47° C. After stirring for two hours the reaction solution was washed successively with 100 ml. portions of 25% HCl solution, water, and 1% aqueous $NaHCO_3$ solution. A clear amber liquid was obtained by filtration of the cloudy brown solution through filter paper. The liquid was stripped of toluene and water under vacuum. The residue solidified upon cooling in an ice bath. Crystallization twice from ethanol resulted in a product melting at 65–66° C.

EXAMPLE VII

*Preparation of N - octyl - 1,4,5,6,7,7 - hexachlorobicyclo-[2.2.1]-5-heptene-2,3-dicarboximide*

(The octyl amine used was a commercial preparation of eight carbon atom aliphatic primary amines—"Armeen 8D"—Armour and Company.)

To 1,4,5,6,7,7 - hexachlorobicyclo - [2.2.1]-5-heptene-2,3-dicarboxylic anhydride (0.25 mole; 93 g.) in 300 ml. of toluene was added octyl amine (0.25 mole; 32.2 g.). The reaction mixture was stirred for thirty minutes. Toluene and water were removed by distillation under vacuum. The residue was dissolved in 95% ethanol, treated with activated charcoal, and filtered. The filtrate was concentrated over a steam bath and upon cooling a white crystalline precipitate formed. This precipitate was recrystallized twice from ethanol. It melted at 58.5–59° C. Results of elementary analysis are as follows:

Calculated for $C_{17}H_{19}Cl_6O_2N$: C, 42.32%; H, 3.94%; Cl, 44.19%. Found for purified product: C, 42.39%; H, 3.83%; Cl, 43.39%.

EXAMPLE VIII

*Preparation of N - dodecyl - 1,4,5,6,7,7 - hexachlorobicyclo-[2.2.1]-5-heptene-2,3-dicarboximide*

(The dodecyl amine utilized was a commercial product of twelve carbon atom aliphatic primary amines sold by Armour and Company under the name of "Armeen 12D.")

To 1,4,5,6,7,7 - hexachlorobicyclo - [2.2.1]-5-heptene-2,3-dicarboxylic anhydride (0.25 mole; 93 g.) in 300 ml. toluene, was added "Armeen 12D" (0.25 mole; 40.2 g.) over a four-minute period. After addition was complete the reaction mixture was stirred for 30 minutes. The toluene solvent and water were removed by distillation in vacuo. The residue was chilled for a period of a week, and a slurry of crystals was obtained. This slurry was crystallized from ethanol (95%) and upon drying melted at 45–48° C. A purified sample was prepared by recrystallizing the product twice from ethanol. This purified sample melted at 46.5°–47.5° C. The product had the following elementary analysis:

Calculated for $C_{21}H_{27}Cl_6O_2N$: C, 46.84%; H, 5.02%; Cl, 39.59%. Found for purified product: C, 46.70%; H, 5.21%; Cl, 39.62%.

EXAMPLE IX

*Preparation of 1,4,5,6,7,7 - hexachlorobicyclo - [2.2.1]-5-heptene-2,3-dicarboximide*

1,4,5,6,7,7 - hexachlorobicyclo - [2.2.1] - 5 - heptene-2,3-dicarboxylic anhydride (0.1 mol; 37.1 grams) was mixed with ammonium carbonate monohydrate (0.1 mole; 11.4 grams) in a covered beaker and heated to fusion with stirring. The fused mixture was cooled and dissolved in 400 ml. of boiling xylene. Carbonaceous matter was filtered off and the solution was concentrated to 200 ml., crystallization resulting readily on cooling. The product was filtered and dried at 110° C. It had a melting point of 274–277° C. and weighed 25.5 g. The filtrate was further concentrated to result in additional material, the yield totaling about 80% of the theory.

EXAMPLE X

*Preparation of N - potassium - 1,4,5,6,7,7 - hexachlorobicyclo-[2.2.1]-5-heptene-2,3-dicarboximide*

Potassium hydroxide (0.1 mole; 5.8 grams) was dissolved in absolute methanol (75 ml.) at room temperature, and the resulting solution was added to a boiling solution of the imide prepared in Example IX above (0.1 mole; 37.1 grams) in anhydrous dioxane (75 ml.). The resulting solution which contained the desired potassium salt of the imide was cooled to room temperature.

EXAMPLE XI

*Preparation of N - allyl - 1,4,5,6,7,7 - hexachlorobicyclo-[2.2.1]-5-heptene-2,3-dicarboximide*

To N-potassium-1,4,5,6,7,7-hexachlorobicyclo-[2.2.1]-5-heptene-2,3-dicarboximide (0.1 mole; 40.9 g.) in 100 cc. dioxane-methanol (50–50) solution, was added allyl bromide (0.1 mole; 12.1 g.). The reaction mixture was allowed to stand at room temperature for a 48-hour period. A solid continued to precipitate out until the end of an eight-hour period. Upon concentration of the dioxane-methanol solution, two crops of crystals were recovered. Upon pouring the filtrate into water an additional quantity was recovered. The melting point of the first crop after washing with water was 93–99° C. Upon recrystallization from heptane the compound melted at 115–116° C. A portion crystallized from isopropanol-water solution melted at 114.8–116.5° C. The product had the following elementary analysis:

Calculated for $C_{12}H_7Cl_6O_2N$: C, 35.17%; H, 1.71%; Cl, 51.93%. Found for purified product: C, 35.24%; H, 1.65%; Cl, 51.89%.

EXAMPLE XII

*Preparation of N-amyl-1,4,5,6,7,7-hexachlorobicyclo-[2.2.1]-5-heptene-2,3-dicarboximide*

To 1,4,5,6,7,7-hexachlorobicyclo - [2.2.1] - 5-heptene-2,3-dicarboxylic anhydride (0.1 mole; 37.1 grams) in 100 ml. of anhydrous dioxane, was added amyl amine (0.11 mole; 4.6 g.). The reaction mixture was placed in a flask equipped with a reflux condenser and refluxed for three hours. At the end of this time most of the dioxane solvent was removed by distillation and the residue was treated with a dilute aqueous solution of HCl until it solidified. The product thus obtained recrystallized twice from hexane melted at 100–102° C.

Calculated for $C_{14}H_{11}Cl_6O_2N$: C, 38.21%; H, 2.98%; Cl, 48.35%. Found for product: C, 38.16%; H, 3.01%; Cl, 48.38%.

EXAMPLE XIII

*Preparation of N-decyl-1,4,5,6,7,7-hexachlorobicyclo-[2.2.1]-5-heptene-2,3-dicarboximide*

To 1,4,5,6,7,7-hexachlorobicyclo - [2.2.1] - 5 - heptene-2,3-dicarboxylic anhydride (0.25 mole; 93 g.) in 300 ml. of toluene was added decylamine (0.25 mole; 39 g.) over a period of five minutes. The temperature of the solution rose from 24 to 54° C. After stirring for 1½ hours the temperature of the reaction mixture had dropped to 28° C. The toluene solvent and water formed in the reaction were removed by distillation and the residue placed in a refrigerator overnight. The product was distilled under reduced pressure and a material was collected between 221–223° C. at 0.2 mm. of Hg pressure. A small portion of this material was dissolved in 40 cc. of 95% ethanol, treated with activated charcoal, and filtered with the aid of "Hyflo Supercel." The filtrate was chilled to about 10° C. for 48 hours. Crystals were deposited which had a melting point near room temperature. These crystals were recrystallized from ethanol and melted at 32° C.

EXAMPLE XIV

*Preparation of N - octadecyl - 1,4,5,6,7,7-hexachlorobicyclo-[2.2.1]-5-heptene-2,3-dicarboximide*

(The amine utilized was a mixture of 18 carbon atom primary amines; "Armeen 18D," Armour and Company.)

To 1,4,5,6,7,7-hexachlorobicyclo - [2.2.1] - 5-heptene-2,3-dicarboxylic anhydride (0.5 mole; 186 g.) in 500 ml.

toluene in a beaker was added with stirring octadecyl amine (0.5 mole; 148 g.). The temperature rose from 24 to 48° C. due to the exothermic nature of the reaction. The contents of the beaker were stirred for 1¼ hours and then washed with 100 ml. of 2.5% HCl, 100 ml. of water, and finally with 100 ml. of 1% NaHCO₃. It was then filtered and placed into a distilling flask. The toluene and water formed by reaction were removed by distillation in vacuo, and the residue was a solid which melted at 67–70° C. The product was dissolved in ethanol, treated with activated charcoal and recrystallized several times. The product thus purified melted at 73–79° C.

EXAMPLE XV

*Preparation of N - (p-chloro-phenyl) - 1,4,5,6,7,7-hexachlorobicyclo-[2.2.1]-5-heptene-2,3-dicarboximide*

To 1,4,5,6,7,7-hexachlorobicyclo - [2.2.1]-5-heptene-2,3-dicarboxylic anhydride (0.15 mole; 55.6 g.) in 150 ml. of xylene was added p-chloro-aniline (0.15 mole; 19.1 g) in a flask equipped with a reflux condenser and Dean-Stark tube attached thereto. The reaction mixture was refluxed for 45 minutes, at the end of which time 2.6 ml. of water was collected in the Dean-Stark tube (theoretical 2.7 ml.). The reaction mixture was allowed to cool and the product crystallized out of the mixture. The crystalline material was collected on a Buchner funnel, washed with xylene and pentane and air dried. The crude product weighed 68.99 grams and melted at 260–264° C. The crude product crystallized from benzene melted at 263–264° C. and had the following elementary analysis:

Calculated for $C_{15}H_6Cl_7O_2N$: C, 37.50%; H, 1.26%; Cl, 51.66%. Found for purified product: C, 37.61%; H, 1.31%; Cl, 51.48%.

EXAMPLE XVI

*Preparation of N-(p-sulfamido-phenyl)-1,4,5,6,7,7-hexachlorobicyclo-[2.2.1]-5-pentene-2,3-dicarboximide*

To 1,4,5,6,7,7-hexachlorobicyclo - [2.2.1]-5-heptene-2,3-dicarboxylic anhydride (0.15 mole; 55.6 g.) in 250 ml. of xylene was added sulfanilamide (0.15 mole; 25.8 g). The reaction was carried out in a 500 ml. flask equipped with a reflux condenser and Dean-Stark tube. The mixture was refluxed for 9½ hours, at the end of which time 2.65 ml. of water was entrapped (theory=2.7 ml.); the reaction mixture was allowed to cool. A crystalline material precipitated from the reaction mixture and was recovered in a Buchner funnel (67 g.). The crude product was purified by recrystallization from dioxane several times.

The purified sample melted at 325–327° C. (uncorrected).

Calculated for $C_{15}H_8Cl_6O_4N_2S$: C, 34.31%; H, 1.54%; Cl, 40.52%. Found for purified product: C, 34.32%; H, 1.62%; Cl, 40.38%.

EXAMPLE XVII

*Preparation of N-(1-naphthyl)-1,4,5,6,7,7 - hexachlorobicyclo-[2.2.1]-5-heptene-2,3-dicarboximide*

To 1,4,5,6,7,7-hexachlorobicyclo-[2.2.1]-5-heptene-2,3-dicarboxylic anhydride (0.25 mol; 93 g.) in toluene (300 ml.) is added a naphthylamine (0.25 mol; 35.8 g.) over a period of ten minutes. The reaction mixture is stirred without external heating for one hour and then heated at reflux to remove water formed by the reaction, collecting the aqueous part in a Dean-Stark trap. The reaction mixture is then stripped of the remaining toluene solvent in vacuo and the residue allowed to cool. The crude product is dissolved in ether and the solution washed successively with 5% aqueous sodium bicarbonate solution, 5% HCl solution, and water. The solution of product is dried over anhydrous magnesium sulfate. The ether is stripped from the product in vacuo and the residue recovered from the concentrated solution. The product may be further purified by crystallization from ethanol.

EXAMPLE XVIII

*Preparation of N-cyclohexyl - 1,4,5,6,7,7 - hexachlorobicyclo-[2.2.1]-5-heptene-2,3-dicarboximide*

To 1,4,5,6,7,7-hexachlorobicyclo-[2.2.1]-5-heptene-2,3-dicarboxylic anhydride (0.25 mol; 93 g.) in toluene (300 ml.) is added cyclohexylamine (0.25 mol; 26.8 g.) over a four-minute period. During addition the temperature rises about 15° C. over room temperature. The reaction mixture is stirred without heating for a period of one hour, and then heated to azeotrope the water formed, from the reaction mixture. The remaining toluene solvent is removed by distillation. The residue in the flask is dissolved in ether and the solution washed successively with 5% aqueous NaHCO₃, 5% HCl, and water. The product is dried with anhydrous MgSO₄ and the ether solvent removed by vacuum distillation. The product is the desired cyclohexylimide.

I claim as my invention:

1. As a new composition of matter an N-substituted imide of 1,4,5,6,7,7-hexachlorobicyclo-[2.2.1]-5-heptene-2,3-dicarboxylic acid wherein the substituent on the imide nitrogen is the amino-free residual radical of a primary monofunctional amine containing one to twenty-two carbon atoms of the group consisting of aliphatic hydrocarbon amines, cycloaliphatic hydrocarbon amines and carbocyclic aryl amines.

2. As a new composition of matter N-allyl-1,4,5,6,7,7-hexachlorobicyclo-[2.2.1]-5-heptene-2,3-dicarboximide.

3. As a new composition of matter N-cyclohexyl-1,4,5,6,7,7-hexachlorobicyclo-[2.2.1]-5-heptene - 2,3-dicarboximide.

4. As a new composition of matter N-dodecyl-1,4,5,6,7,7-hexachlorobicyclo - [2.2.1]-5-heptene - 2,3 - dicarboximide.

5. As a new composition of matter N-(p-chlorophenyl)-1,4,5,6,7,7-hexachlorobicyclo-[2.2.1]-5 - heptene-2,3-dicarboximide.

6. As a new composition of matter N-(1-naphthyl)-1,4,5,6,7,7-hexachlorobicycle-[2.2.1]-5-heptene - 2,3 - dicarboximide.

References Cited in the file of this patent

UNITED STATES PATENTS

| | | |
|---|---|---|
| 1,216,134 | Kardos | Feb. 13, 1917 |
| 1,406,547 | Faust | Feb. 14, 1922 |
| 1,450,678 | Gibbs | Apr. 3, 1923 |
| 2,225,392 | Pool et al. | Dec. 17, 1940 |
| 2,276,840 | Hanford et al. | Mar. 17, 1942 |
| 2,365,405 | Gartner | Dec. 19, 1944 |
| 2,425,288 | Tryon | Aug. 5, 1947 |
| 2,443,888 | Bohrer | June 22, 1948 |
| 2,452,315 | Morgan | Oct. 26, 1948 |
| 2,476,512 | Schreiber | July 19, 1949 |
| 2,598,562 | Kleiman | May 27, 1952 |
| 2,650,207 | Rust et al. | Aug. 25, 1953 |
| 2,697,101 | Kleiman | Dec. 14, 1954 |